US006618980B1

(12) United States Patent
De Boer, Jr.

(10) Patent No.: US 6,618,980 B1
(45) Date of Patent: Sep. 16, 2003

(54) FISHING BAIT SUSPENSION ASSEMBLY

(76) Inventor: Melvin De Boer, Jr., 3705 E. 12th, Sioux Falls, SD (US) 57103

(*) Notice: Subject to any disclaimer, the term of this patent is extended or adjusted under 35 U.S.C. 154(b) by 0 days.

(21) Appl. No.: 09/775,436

(22) Filed: Feb. 2, 2001

(51) Int. Cl.⁷ .............................................. A01K 91/00
(52) U.S. Cl. ..................................... 43/42.74; 43/43.15
(58) Field of Search .............................. 43/42.74, 43.15, 43/43.1, 27.4, 43.12, 43.13, 43.16, 43.2, 44.87, 44.9, 4.5

(56) References Cited

U.S. PATENT DOCUMENTS

| 1,019,926 | A | | 3/1912 | Staples | |
|---|---|---|---|---|---|
| 1,995,985 | A | | 3/1935 | Jennings | |
| 2,157,003 | A | * | 5/1939 | Mussina | 43/42.74 |
| 2,170,067 | A | | 8/1939 | Stephen | |
| 2,289,663 | A | * | 7/1942 | Linhares | 43/42.74 |
| 2,814,901 | A | * | 12/1957 | Suiter | 43/42.74 |
| 2,848,835 | A | * | 8/1958 | Witt | 43/42.74 |
| 3,087,275 | A | * | 4/1963 | Svoboda | 43/44.87 |
| 3,421,250 | A | * | 1/1969 | Krieg | 43/42.74 |
| 3,744,178 | A | * | 7/1973 | Denny | 43/42.74 |
| 3,943,652 | A | * | 3/1976 | Aunspaugh | 43/42.74 |
| 4,201,008 | A | | 5/1980 | Sparkman | |
| 4,428,144 | A | | 1/1984 | Dickinson | |
| 4,450,645 | A | | 5/1984 | Ancona | |
| 4,794,721 | A | | 1/1989 | Rowe, Jr. et al. | |
| 4,823,501 | A | | 4/1989 | Standish, Jr. | |
| 5,138,789 | A | | 8/1992 | Hood | |
| 5,253,446 | A | | 10/1993 | Ogle | |
| 5,337,509 | A | * | 8/1994 | Harold | 43/42.74 |
| 5,412,899 | A | | 5/1995 | Reboul | |
| 5,444,936 | A | * | 8/1995 | McDonald | 43/42.74 |
| D375,137 | S | | 10/1996 | Bussard | |
| 5,930,941 | A | | 8/1999 | Hayes, II et al. | |

FOREIGN PATENT DOCUMENTS

GB    2068201    *  8/1981    ..........  A01K/91/04

* cited by examiner

Primary Examiner—Charles T. Jordan
Assistant Examiner—D. Parsley

(57) ABSTRACT

A fishing bait suspension assembly for submerging fishing bait while preventing the bait from contacting a bottom of a body of water while fishing includes a rod member having a pair of outwardly extending top flanges, a buoyant member coupled to the rod member proximate said top flanges, and a lead line having opposite ends extending through distal ends of the top flanges. The bottom of the rod member is designed to contact the bottom of the body of water while the buoyant member holds the rod member in an upright position. The bait is attached to the top flanges.

15 Claims, 6 Drawing Sheets

FISHING BAIT SUSPENSION ASSEMBLY

BACKGROUND OF THE INVENTION

1. Field of the Invention

The present invention relates to fishing lures and more particularly pertains to a new fishing bait suspension assembly for submerging fishing bait while preventing the bait from contacting a bottom of a body of water while fishing.

2. Description of the Prior Art

The use of fishing lures is known in the prior art. More specifically, fishing lures heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 1,995,985; 4,823,501; 4,450,645; 5,412,899; 4,794,721; 5,930,941; 5,253,446; 4,201,008; 1,019,926; 5,138,789; 4,428,144; 2,170,067; and Des. 375,137.

While these devices fulfill their respective, particular objectives and requirements, the aforementioned patents do not disclose a new fishing bait suspension assembly. The inventive device includes a rod member having a pair of outwardly extending top flanges, a buoyant member coupled to said rod member proximate said top flanges, and a lead line having opposite ends extending through distal ends of the top flanges.

In these respects, the fishing bait suspension assembly according to the present invention substantially departs from the conventional concepts and designs of the prior art, and in so doing provides an apparatus primarily developed for the purpose of submerging a fishing lure while preventing the fishing lure from contacting a bottom of a body of water while fishing.

SUMMARY OF THE INVENTION

In view of the foregoing disadvantages inherent in the known types of fishing lures now present in the prior art, the present invention provides a new fishing bait suspension assembly construction wherein the same can be utilized for submerging fishing bait while preventing the bait from contacting a bottom of a body of water while fishing.

The general purpose of the present invention, which will be described subsequently in greater detail, is to provide a new fishing bait suspension assembly apparatus and method which has many of the advantages of the fishing lures mentioned heretofore and many novel features that result in a new fishing bait suspension assembly which is not anticipated, rendered obvious, suggested, or even implied by any of the prior art fishing lures, either alone or in any combination thereof.

To attain this, the present invention generally comprises a rod member having a pair of outwardly extending top flanges, a buoyant member coupled to said rod member proximate said top flanges, and a lead line having opposite ends extending through distal ends of the top flanges.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter. of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fishing bait suspension assembly apparatus and method which has many of the advantages of the fishing lures mentioned heretofore and many novel features that result in a new fishing bait suspension assembly which is not anticipated, rendered obvious, suggested, or even implied by any of the prior art fishing lures, either alone or in any combination thereof.

It is another object of the present invention to provide a new fishing bait suspension assembly that may be easily and efficiently manufactured and marketed.

It is a further object of the present invention to provide a new fishing bait suspension assembly that is of a durable and reliable construction.

An even further object of the present invention is to provide a new fishing bait suspension assembly which is susceptible of a low cost of manufacture with regard to both materials and labor, and which accordingly is then susceptible of low prices of sale to the consuming public, thereby making such fishing bait suspension assembly economically available to the buying public.

Still yet another object of the present invention is to provide a new fishing bait suspension assembly which provides in the apparatuses and methods of the prior art some of the advantages thereof, while simultaneously overcoming some of the disadvantages normally associated therewith.

Still another object of the present invention is to provide a new fishing bait suspension assembly for submerging fishing bait while preventing the bait from contacting a bottom of a body of water while fishing.

Yet another object of the present invention is to provide a new fishing bait suspension assembly which includes a rod member having a pair of outwardly extending top flanges, a buoyant member coupled to said rod member proximate said top flanges, and a lead line having opposite ends extending through distal ends of the top flanges.

Still yet another object of the present invention is to provide a new fishing bait suspension assembly that is weighted such that the assembly will sink in water.

Even still another object of the present invention is to provide a new fishing bait suspension assembly that provides a buoyant member for holding the assembly in an upright position while submerged in water.

Yet still another object of the present invention is to provide a new fishing bait suspension assembly that includes a coupler for holding a baited hook above a ground surface of a body of water in which the assembly is submerged.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
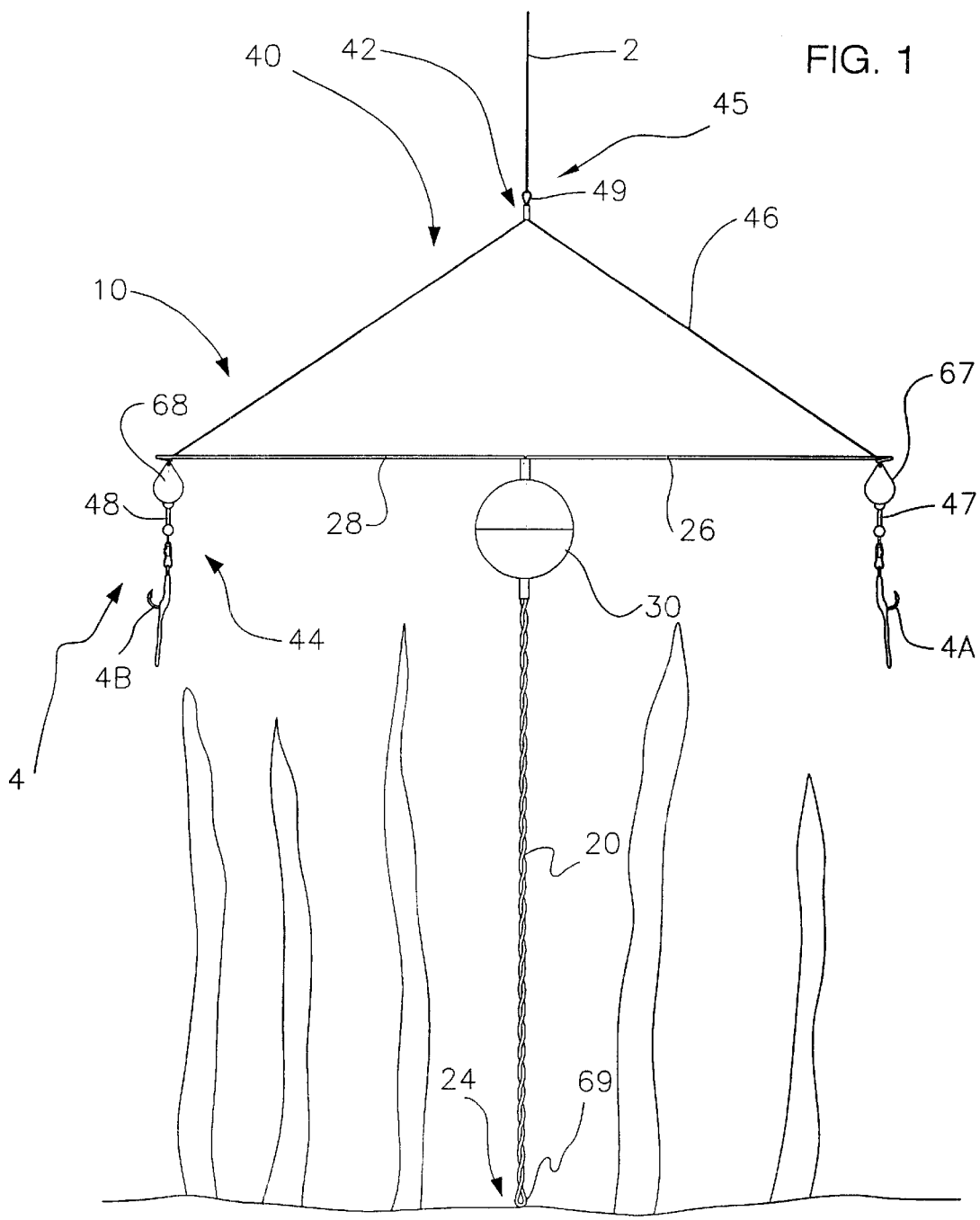
FIG. 1 is a perspective view of a new fishing bait suspension assembly according to the present invention.
Figure 2:
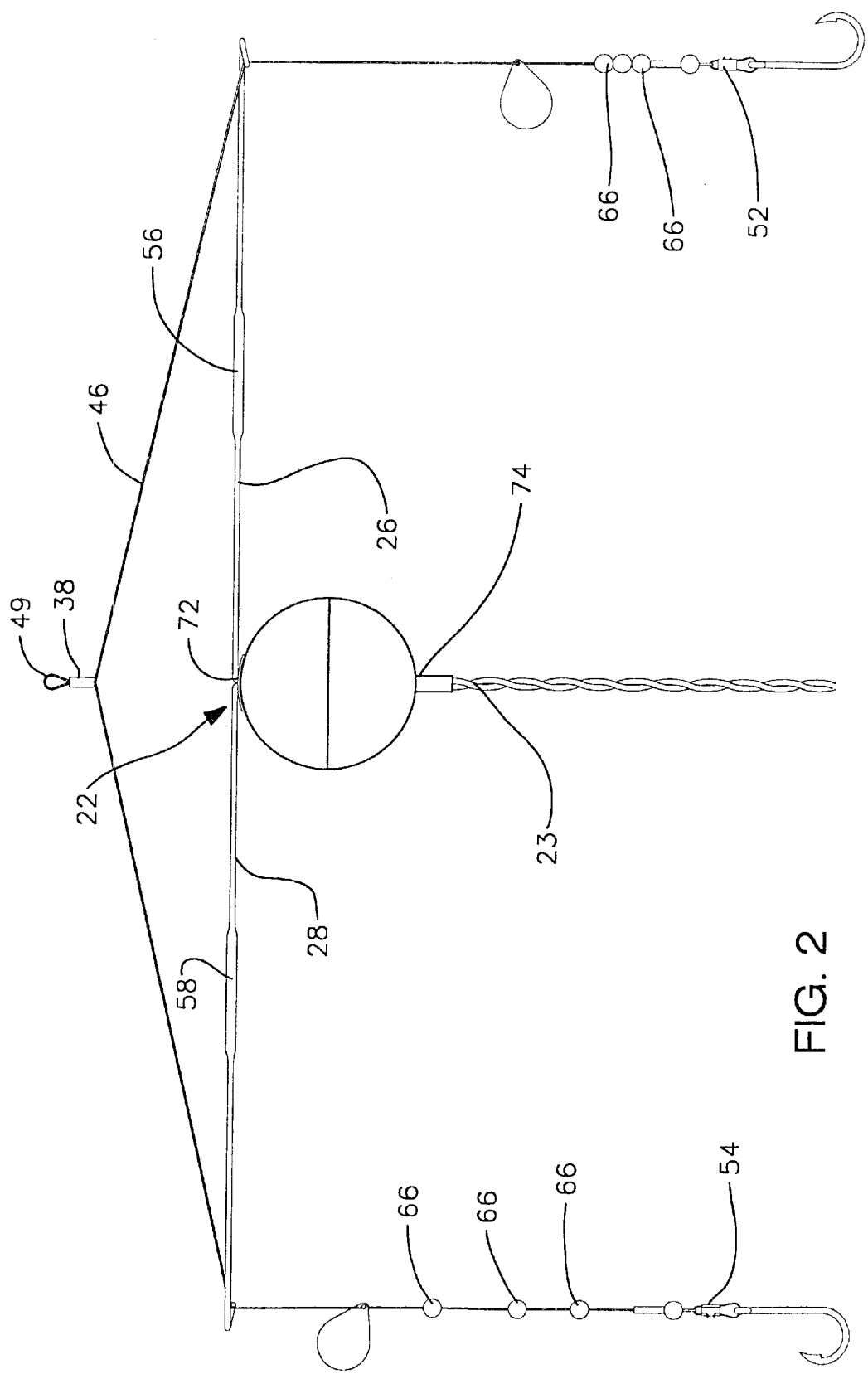
FIG. 2 is a front view of the present invention.
Figure 3:
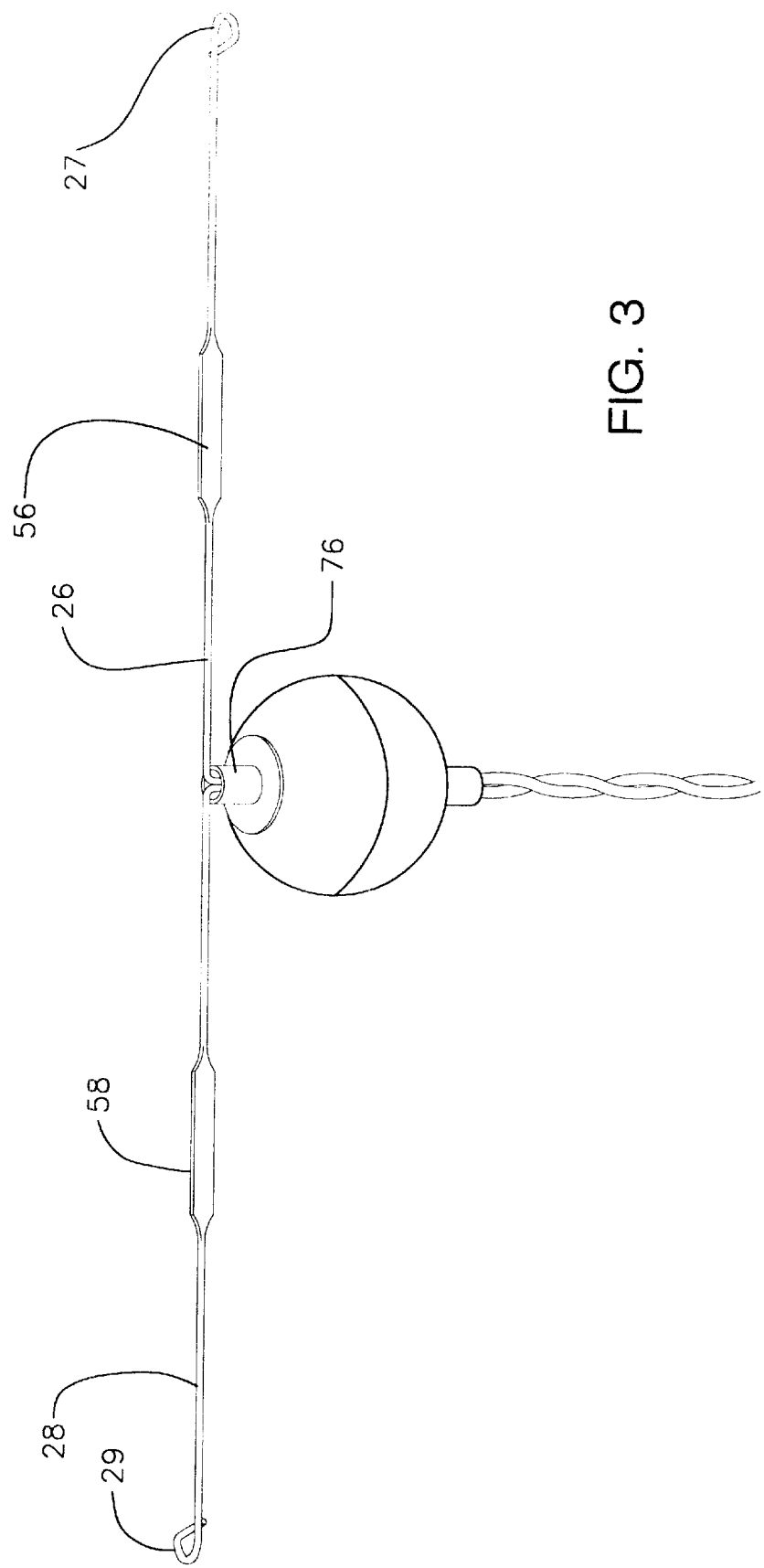
FIG. 3 is a top view of the present invention.
Figure 4:
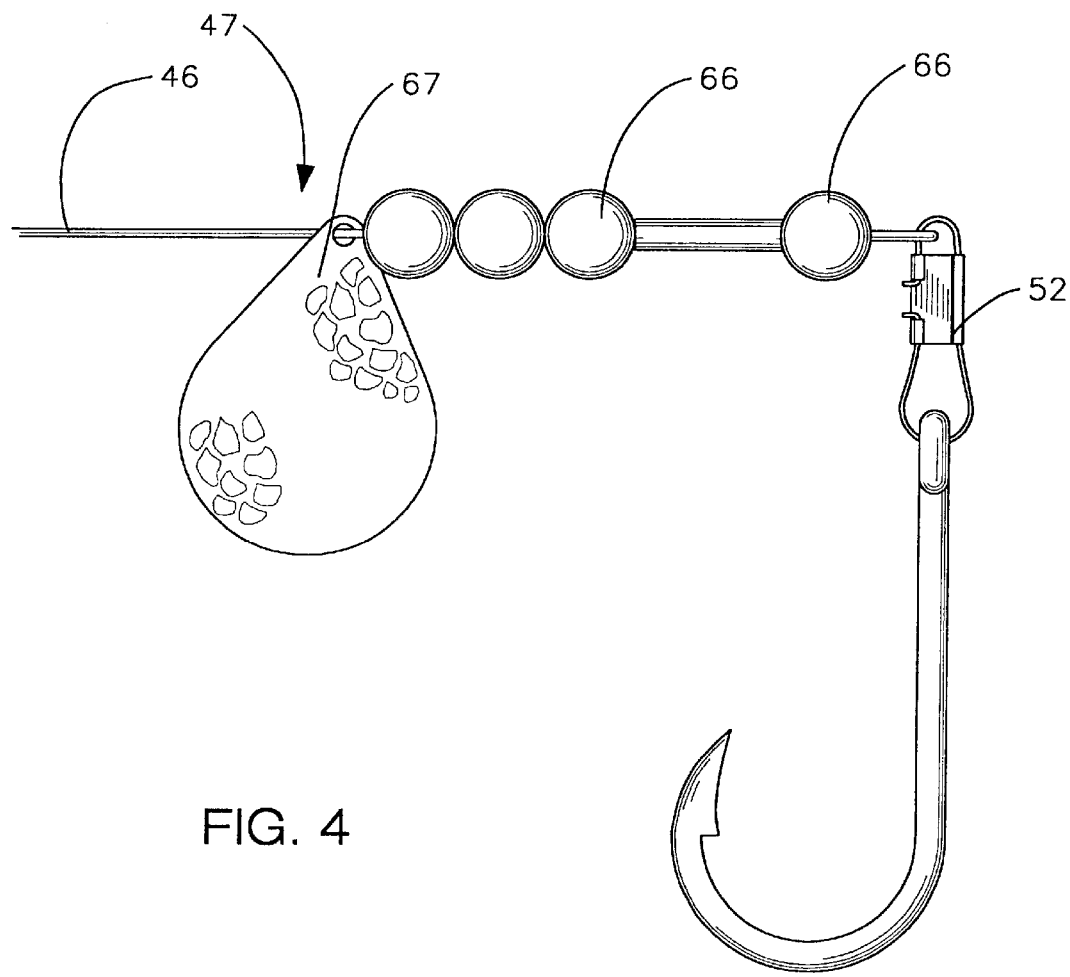
FIG. 4 is a perspective view of one end of the line member of the present invention.
Figure 5:
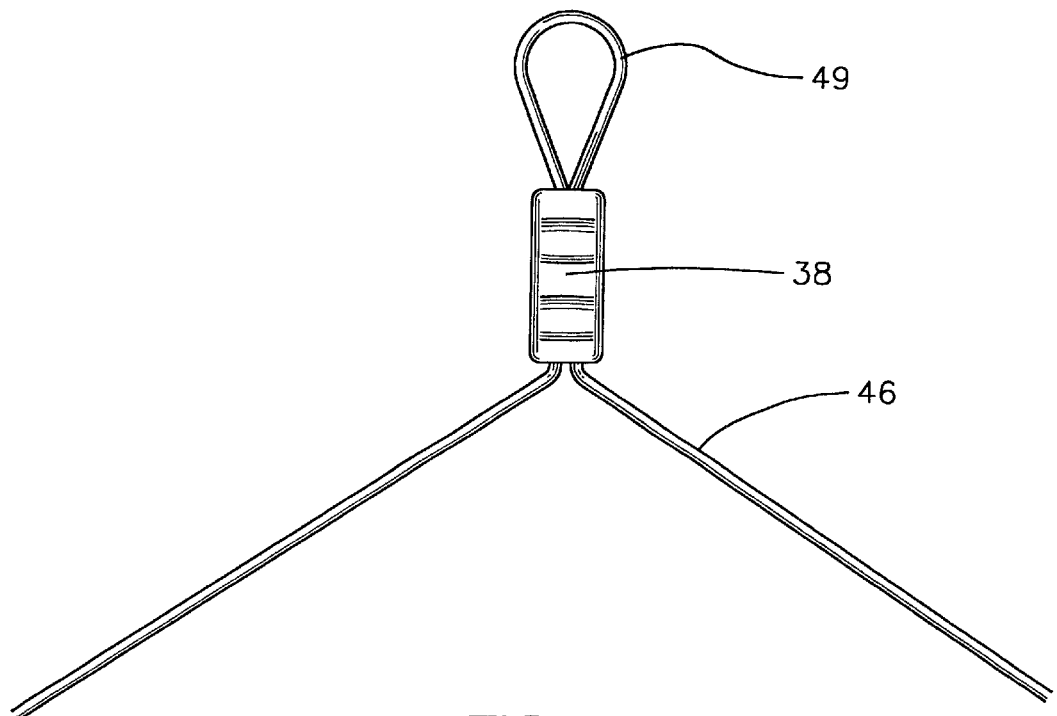
FIG. 5 is a front view of the clip member coupled to the line member of the present invention.
Figure 6:
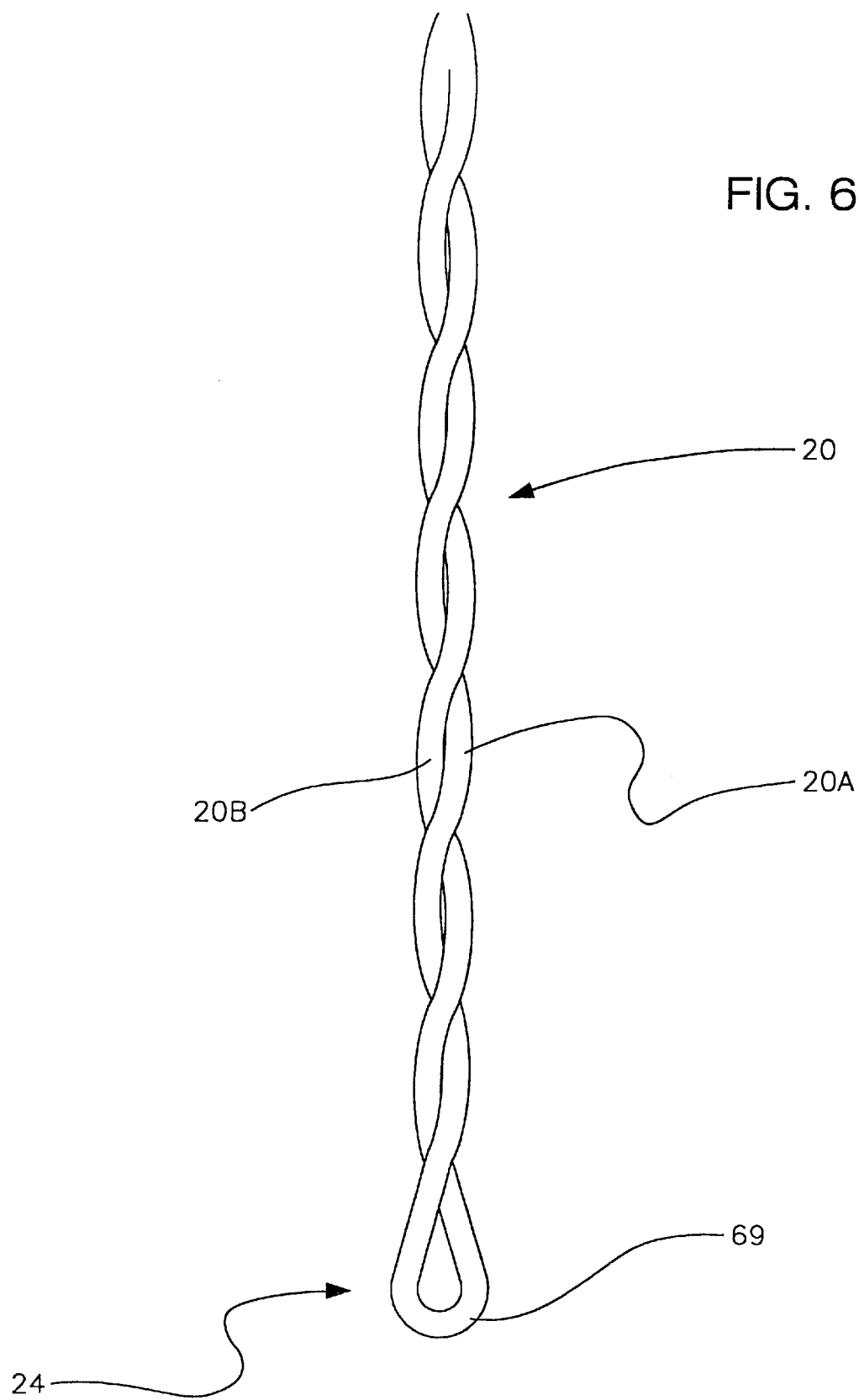
FIG. 6 is a front view of the bottom loop of the rod member of the present invention.

With reference now to the drawings, and in particular to FIGS. 1 through 6 thereof, a new fishing bait suspension assembly embodying the principles and concepts of the present invention and generally designated by the reference numeral 10 will be described.

As best illustrated in FIGS. 1 through 6, the fishing bait suspension assembly 10 generally comprises a rod member 20, a buoyant member 30, and a coupler 40 for attaching the rod member 20 to a fishing line 2.

The buoyant member 30 is coupled to the rod member proximate a top 22 of the rod member 20. Thus the buoyant member 30 is designed for holding the rod member 20 in a substantially upright position when the rod member 20 is submerged in water. The rod member has a weight sufficient to submerge the rod member and buoyant member such that a bottom 24 of the rod member 20 contacts a bottom of a body of water in which the rod member 20 is submerged.

The coupler 40 is attached to the rod member 20. In an embodiment, the coupler 40 includes a first portion 42 designed for coupling the coupler 40 to the fishing line 2 and a second portion 44 designed for coupling to a baited hook 4. The coupler 40 is designed such that the baited hook 4 is positioned generally between the top 22 and the bottom 24 of the rod member 20 during use. Thus the coupler 40 is designed for suspending the baited hook 4 above the bottom of the body of water in which the rod member 20 is submerged.

In an embodiment, a pair of extension arms 26 and 28 extend outwardly from the top 22 of the rod member 20. Each of the extension arms 26 and 28 includes a respective distal loop portion 27 and 29.

In an embodiment, the coupler 40 is a line member 46 that includes a first end 47, a second end 48 and a medial loop 49. The medial loop 49 is designed for coupling to the fishing line 2. The first end 47 of the line member 46 is inserted through the distal loop portion 27 of a first one of the extension arms 26 and the second end 48 of the line member 46 is inserted through the distal loop portion 29 of a second one of the extension arms 28.

A first end coupler 52 is attached to the first end 47 of the line member 46. Thus the line member 46 is coupled to the first one of the extension arms 26. The first end coupler 52 is further designed for coupling to a first baited hook 4A.

A second end coupler 54 is coupled to the second end 48 of the line member 46. Thus the line member 46 is coupled to the second one of the extension arms 28. The second end coupler 54 is further designed for coupling to a second baited hook 4B.

In an embodiment, each of the first and second extension arms 26 and 28 includes a flattened portion 56 and 58. The flattened portions 56 and 58 are angled with respect to each other. Thus the flattened portions 56 and 58 urge the rod member 20 to spin about a longitudinal axis of the rod member when the rod member is pulled through water.

A plurality of beads 66 are coupled to the line member 46. Each of the beads 66 is positioned proximate a respective one of the first end 47 and the second end 48 of the line member 46. Thus the first and second ends 47 and 48 of the line member 46 are designed for attracting fish.

In an embodiment, a pair of spinner blades 67 and 68 are coupled to the line member 46 proximate an associated one of the first and second ends 47 and 48 of the line member 46.

In an embodiment, the rod member 20 is formed by a pair of coextensive wire members 20A and 20B. The coextensive wire members 20A and 20B are twisted together to form a helical shape for enhancing an appearance of movement by the rod member 20 as the rod member 20 spins when the rod member 20 is pulled through water.

In an embodiment, the coextensive wire members 20A and 20B are integrally joined to form a bottom loop 69 at the bottom 24 of the rod member 20.

In an embodiment, a clip member 38 is coupled to a medial portion 45 of the line member 46 for forming the medial loop 49 in the line member 46 such that the first and second ends 47 and 48 are equidistant from the medial loop 49.

In an embodiment, a length of the first extension arm 26 is equal to a length of the second extension arm 28. Thus the medial loop 49 is positioned in alignment with a longitudinal axis of the rod member 20 when the rod member 20 is pulled through water by the fishing line 2.

The rod member 20 passes through the buoyant member 30. In an embodiment, the rod member 20 includes a broadened portion 23 proximate the buoyant member 30 such that the buoyant member 30 is positioned between the first and second extension arms, 26 and 28, and the broadened portion 23 for preventing the buoyant member 30 from sliding along the rod member 20. A first washer member 72 is coupled to the rod member 20 between the buoyant member 30 and the first and second extension arms 26 and 28. A second washer member 74 is coupled to the rod member 20 between the buoyant member 30 and the broadened portion 23.

Alternately the buoyant member 30 is frictionally engaged to a collar 76 passing through the buoyant member 30 and the collar 76 is slidably coupled to the rod member 20. The collar 76 ideally has a width only slightly greater than a width of the rod member 20 such that the collar 76 is snugly engaged to the rod member 20 for holding the collar 76 in a static position relative to the rod member 20 during use.

In use, baited hooks are attached to the ends of the line member and the medial loop is attached to a fishing line. The rod member is then cast into a body of water and sinks. The buoyant member holds the rod member in a substantially upright position under the water. Slack is taken up to facilitate positioning the baited hooks such that the hooks are suspended above a bottom of the body of water when the bottom of the rod member contacts the bottom of the body of water. The rod member may be left in the water without providing additional movement or the fishing line may be jigged to attract fish. When a bite is felt, the baited hook is set by pulling on the fishing line.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing bait suspension assembly comprising:
    a rod member having a top and a bottom;
    a buoyant member coupled to said rod member proximate said top of said rod member whereby said buoyant member is adapted for holding said rod member in a substantially upright position when said rod member is submerged in water and said bottom of said rod member contacts a bottom of a body of water in which said rod member is submerged;
    a coupler coupled to said rod member, said coupler having a first portion adapted for coupling said coupler to a fishing line, said coupler having a second portion adapted for coupling to a baited hook such that the baited hook is positioned generally between said top and said bottom of said rod member whereby said coupler is adapted for suspending the baited hook above the bottom of the body of water in which said rod member is submerged;
    a pair of extension arms extending outwardly from said top of said rod member, each of said extension arms having a respective distal loop portion;
    said coupler being a line member having a first end, a second end and a medial loop, said medial loop being adapted for coupling to the fishing line such that pulling on the fishing line pulls on said medial loop when said medial loop is coupled to the fishing line;
    said first end of said line member being inserted through said distal loop portion of a first one of said extension arms and said second end of said line member being inserted through said distal loop portion of a second one of said extension arms;
    a first end coupler coupled to said first end of said line member whereby said line member is coupled to said first one of said extension arms such that said line member is freely slidable through said distal loop portion of said first one of said extension arms, said first end coupler being adapted for coupling to a first baited hook; and
    a second end coupler coupled to said second end of said line member whereby said line member is coupled to said second one of said extension arms such that said line member is freely slidable through said distal loop portion of said second one of said extension arms, said second end coupler being adapted for coupling to a second baited hook.

2. The fishing bait suspension assembly of claim 1, further comprising:
    each of said first and second extension arms having a flattened portion, said flattened portions being angled with respect to each other whereby said flattened portions urge said rod member to spin about a longitudinal axis of said rod member when said rod member is pulled through water.

3. The fishing bait suspension assembly of claim 1, further comprising:
    a plurality of beads coupled to said line member, each of said beads being positioned proximate a respective one of said first end and said second end of said line member whereby said first and second ends of said line member are adapted for attracting fish.

4. The fishing bait suspension assembly of claim 1, further comprising:
    a pair of spinner blades, each spinner blade being coupled to said line member proximate an associated one of said first and second ends of said line member.

5. The fishing bait suspension assembly of claim 2, further comprising:
    said rod member being formed by a pair of coextensive wire members, said coextensive wire members being twisted together to form a helical shape for enhancing an appearance of movement by said rod member as said rod member spins when said rod member is pulled through water.

6. The fishing bait suspension assembly of claim 5, further comprising:
    said coextensive wire members being integrally joined to form a bottom loop at said bottom of said rod member.

7. The fishing bait suspension assembly of claim 1, further comprising:
    said buoyant member being frictionally engaged to a collar passing through said buoyant member, said collar being slidably coupled to said rod member, said collar having a width greater than a width of said rod member whereby said collar is snugly engaged to said rod member for holding said collar in a static position relative to said rod member during use.

8. The fishing bait suspension assembly of claim 1, further comprising:
    said rod member passing through said buoyant member; and
    said rod member including a broadened portion proximate said buoyant member such that said buoyant member is positioned between said first and second extension arms and said broadened portion for preventing said buoyant member from sliding along said rod member.

9. The fishing bait suspension assembly of claim 8, further comprising:

a first washer member being coupled to said rod member between said buoyant member and said first and second extension arms.

10. The fishing bait suspension assembly of claim 9, further comprising:

a second washer member, said second washer member being coupled to said rod member between said buoyant member and said broadened portion.

11. The fishing bait suspension assembly of claim 1, further comprising:

a clip member coupled to a medial portion of said line member for forming said medial loop in said line member such that said first and second ends are equidistant from said medial loop.

12. The fishing bait suspension assembly of claim 11, further comprising:

a length of said first extension arm being equal to a length of said second extension arm whereby said medial loop is positioned in alignment with a longitudinal axis of said rod member when said rod member is pulled through water by the fishing line.

13. A fishing bait suspension assembly comprising:

a rod member having a top and a bottom;

a buoyant member coupled to said rod member proximate said top of said rod member whereby said buoyant member is adapted for holding said rod member in a substantially upright position when said rod member is submerged in water and said bottom of said rod member contacts a bottom of a body of water in which said rod member is submerged;

a coupler coupled to said rod member, said coupler having a first portion adapted for coupling said coupler to a fishing line, said coupler having a second portion adapted for coupling to a baited hook such that the baited hook is positioned generally between said top and said bottom of said rod member whereby said coupler is adapted for suspending the baited hook above the bottom of the body of water in which said rod member is submerged;

a pair of extension arms extending outwardly from said top of said rod member, each of said extension arms having a respective distal loop portion;

said coupler being a line member having a first end, a second end and a medial loop, said medial loop being adapted for coupling to the fishing line;

said first end of said line member being inserted through said distal loop portion of a first one of said extension arms and said second end of said line member being inserted through said distal loop portion of a second one of said extension arms;

a first end coupler coupled to said first end of said line member whereby said line member is coupled to said first one of said extension arms, said first end coupler being adapted for coupling to a first baited hook;

a second end coupler coupled to said second end of said line member whereby said line member is coupled to said second one of said extension arms, said second end coupler being adapted for coupling to a second baited hook;

each of said first and second extension arms having a flattened portion, said flattened portions being angled with respect to each other whereby said flattened portions urge said rod member to spin about a longitudinal axis of said rod member when said rod member is pulled through water;

a plurality of beads coupled to said line member, each of said beads being positioned proximate a respective one of said first end and said second end of said line member whereby said first and second ends of said line member are adapted for attracting fish;

a pair of spinner blades, each spinner blade being coupled to said line member proximate an associated one of said first and second ends of said line member;

said rod member being formed by a pair of coextensive wire members, said coextensive wire members being twisted together to form a helical shape for enhancing an appearance of movement by said rod member as said rod member spins when said rod member is pulled through water;

said coextensive wire members being integrally joined to form a bottom loop at said bottom of said rod member;

a clip member coupled to a medial portion of said line member for forming said medial loop in said line member such that said first and second ends are equidistant from said medial loop; and a length of said first extension arm being equal to a length of said second extension arm whereby said medial loop is positioned in alignment with a longitudinal axis of said rod member when said rod member is pulled through water by the fishing line.

14. The fishing bait suspension assembly of claim 13, further comprising:

said rod member passing through said buoyant member;

said rod member including a broadened portion proximate said buoyant member such that said buoyant member is positioned between said first and second extension arms and said broadened portion for preventing said buoyant member from sliding along a length said rod member;

a first washer member being coupled to said rod member between said buoyant member and said first and second extension arms; and a second washer member, said second washer member being coupled to said rod member between said buoyant member and said broadened portion.

15. The fishing bait suspension assembly of claim 13, further comprising:

said buoyant member being frictionally engaged to a collar passing through said buoyant member, said collar being slidably coupled to said rod member, said collar having a width greater than a width of said rod member whereby said collar is snugly engaged to said rod member for holding said collar in a static position relative to said rod member during use.

* * * * *